(12) United States Patent
Warashina (10) Patent No.: US 12,477,238 B2
(45) Date of Patent: Nov. 18, 2025

(54) THREE-DIMENSIONAL-MEASUREMENT DEVICE AND THREE-DIMENSIONAL-MEASUREMENT METHOD (71) Applicant: FANUC CORPORATION, Yamanashi (JP)

(72) Inventor: Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 124 days.

(21) Appl. No.: 18/043,908

(22) PCT Filed: Nov. 18, 2021

(86) PCT No.: PCT/JP2021/042439
§ 371 (c)(1),
(2) Date: Mar. 3, 2023

(87) PCT Pub. No.: WO2022/113877
PCT Pub. Date: Jun. 2, 2022

(65) Prior Publication Data
US 2023/0345142 A1    Oct. 26, 2023

(30) Foreign Application Priority Data

Nov. 25, 2020    (JP) .................. 2020-195178

(51) Int. Cl.
*H04N 25/47* (2023.01)
*G01B 11/00* (2006.01)
(Continued)

(52) U.S. Cl.
CPC .......... *H04N 25/47* (2023.01); *G01B 11/002* (2013.01); *G06T 7/50* (2017.01); *G06V 10/145* (2022.01);
(Continued)

(58) Field of Classification Search
None
See application file for complete search history.

(56) References Cited

U.S. PATENT DOCUMENTS 10,302,424 B2    5/2019  Cossairt et al.
10,659,764 B2    5/2020  Horesh
(Continued)

FOREIGN PATENT DOCUMENTS

CN    109458928 A    3/2019
CN    111521161 A    8/2020
(Continued)

*Primary Examiner* — Tyler W. Sullivan
(74) *Attorney, Agent, or Firm* — HAUPTMAN HAM, LLP (57) ABSTRACT

A three-dimensional measurement device includes a projector for scanning and projecting reference light onto an object, and a light receiver for receiving the reflected reference light by the object. The light receiver monitors a luminance change for each pixel and outputs an event when the luminance change meets or exceeds a preset threshold. Each event includes the pixel's position, the time of the luminance change, and a polarity indicating the direction of the luminance change. The device also includes a calculator that selects a group of events where polarity transitions from positive to negative, calculates a passage time of the reference light through each pixel based on the event's time and threshold luminance value, and calculates the object's three-dimensional information using triangulation from the passage times.

4 Claims, 6 Drawing Sheets

(51) Int. Cl.
  *G06T 7/50* (2017.01)
  *G06V 10/145* (2022.01)
  *H04N 13/239* (2018.01)
  *H04N 13/254* (2018.01)

(52) U.S. Cl.
  CPC ......... *H04N 13/239* (2018.05); *H04N 13/254* (2018.05); *G06T 2200/04* (2013.01); *G06V 2201/121* (2022.01)

(56) References Cited

U.S. PATENT DOCUMENTS

| | | | |
|---|---|---|---|
| 11,303,804 | B2 | 4/2022 | Sironi et al. |
| 2017/0003121 | A1 | 1/2017 | Brandli et al. |
| 2020/0249017 | A1 | 8/2020 | Török et al. |
| 2020/0333186 | A1 | 10/2020 | Incesu et al. |
| 2020/0393487 | A1* | 12/2020 | Kahn .................... A61B 5/1123 |
| 2022/0150424 | A1* | 5/2022 | Numata ................. H04N 25/44 |
| 2022/0268901 | A1* | 8/2022 | Azuma ................... G01S 7/487 |

FOREIGN PATENT DOCUMENTS

| | | |
|---|---|---|
| CN | 111798513 A | 10/2020 |
| CN | 111919434 A | 11/2020 |
| JP | 200088539 A | 3/2000 |
| JP | 2000171223 A | 6/2000 |
| JP | 200290681 A | 3/2002 |
| JP | 2003329419 A | 11/2003 |
| JP | 3542478 B2 | 7/2004 |
| JP | 2006333493 A | 12/2006 |
| JP | 2015501936 A | 1/2015 |
| JP | 2018516395 A | 6/2018 |
| WO | 2017041418 A1 | 3/2017 |

* cited by examiner

FIG. 1

PRIOR ART

FIG. 2

PRIOR ART

THREE-DIMENSIONAL-MEASUREMENT DEVICE AND THREE-DIMENSIONAL-MEASUREMENT METHOD

RELATED APPLICATIONS

The present application is a National Phase of International Application No. PCT/JP2021/042439 filed Nov. 18, 2021, which claims priority to Japanese Application No. 2020-195178, filed Nov. 25, 2020.

TECHNICAL FIELD

The present invention relates to a three-dimensional measurement technique, and in particular, to an optical scanning three-dimensional measurement device and three-dimensional measurement program.

BACKGROUND ART

Many of three-dimensional measuring devices commercialized for industrial use are based on triangulation using structured light. As the structured light, various light projection methods such as a light section method, a phase shift method, and a space encoding method have been proposed. In the light section method, a band-shaped slit light is projected onto an object while scanning the object, the object is imaged from an imaging position different from a projection position, and the distance to the object is calculated by triangulation based on a projection angle of the slit light, an incident angle of the slit light onto the imaging surface and a baseline length between the light projection position and the imaging position. The projection angle of the slit light can be obtained, for example, from a command value to a scanner or a time point of passage of the slit light appearing on the imaging surface, and the incident angle of the slit light can be obtained, for example, from the incident position of the slit light on the imaging surface. The light section method is generally said to be have high distance-measurement accuracy, but compared to the phase shift method or the space encoding method, the number of images required for a single measurement is greater, and thus there is the problem that the measurement takes a long time.

In recent years, an event-based image sensor, based on a concept different from general frame-based image sensors, has been proposed. The frame-based image sensor outputs frame images at predetermined intervals by being exposed by opening/closing a shutter for a predetermined period of time. On the other hand, the event-based image sensor monitors each pixel independently and asynchronously from moment to moment, and then, when a change in luminance exceeding a predetermined threshold is detected, the position of the pixel where the luminance change occurred, the time point when the luminance change occurred, and the polarity representing a direction of the luminance change (whether it has become brighter or darker) are output as an event. The event-based image sensor has a wider dynamic range than the frame-based image sensor, and is faster because it outputs only information of the pixel where the luminance change occurred. Therefore, it is understood that the use of the event-based image sensor will contribute speeding up of the light section method.

The slit light of the light section method has a certain width and has a luminance distribution with a maximum near the center. Focusing on a certain pixel of the image sensor, when the slit light having such a luminance distribution passes through the pixel, the luminance increases as the center of the slit light approaches the pixel, and then decreases after passing. The time point when the slit light passes through the pixel is when the pixel has the maximum luminance. However, an event does not include luminance itself, and is generally generated when a change in luminance from the luminance when the previous event occurs is greater than or equal to a predetermined threshold. Therefore, the timing of generation of the event is not always at the maximum luminance. In the practical use of three-dimensional measurement, it is not always necessary to be the time of maximum luminance, and it is sufficient to capture the same timing with respect to the luminance distribution of the slit light. However, depending on the luminance of the background, it is not known at which stage of the luminance distribution of the slit light an event will occur, and the time interval between events is not constant. Therefore, since the event-based image sensor cannot accurately detect the time point when the slit light passes through the pixel, sufficient distance-measurement accuracy cannot be obtained even if the event-based image sensor is applied to the light section method as it is. Techniques related to the present application are known, for example, as disclosed in the following documents.

Patent Literature 1 discloses a three-dimensional input device, wherein images are synchronously captured by two image sensors while an object is scanned with slit light, frame numbers that the pixels of the respective image sensors detect the maximum brightness are stored, the pixels are associated based on the frame numbers, and a distance is calculated based on the associated pixels.

Patent Literature 2 discloses a method for three-dimensional reconstruction of a scene, wherein a first series of events for each pixel are received from a first sensor, a second series of events for each pixel are received from a second sensor, and a first event in the first series of events is matched to a second event in the second series of events according to the minimization of a cost function.

Patent Literature 3 describes that a multi-slit pattern light is projected, a shift amount of each slit image is calculated from a signal of the multi-slit image detected by a detection optical system with a predetermined magnification, a weight is given to the calculated shift amount of the multi-slit image corresponding to the shift amount, and a height of a sample surface is calculated by performing a weighted average. It is also described that the height of the sample surface is calculated using interpolation of the two heights.

Patent Literature 4 describes that, when a reflected light from an object is incident on a pixel of an area sensor at a certain time point, a distance to the object is calculated by applying triangulation, based on a baseline length from a projection starting point of a slit light to a principal point position of a light receiving lens, an incident angle of the reflected light relative to the reference direction, and a deflection angle at that time point.

Patent Literature 5 describes that a frame number (a time point of imaging) is used as irradiation angle information of a slit light when three-dimensional measurement is performed by the light section method.

Patent Literature 6 discloses a three-dimensional measuring device that scans a spot light, wherein a rise or fall timing of change in luminance at each pixel is used.

CITATION LIST

Patent Literature

[PTL 1] JP 2000-088539 A
[PTL 2] JP 2018-516395 A

[PTL 3] JP 3542478 B
[PTL 4] JP 2002-090681 A
[PTL 5] JP 2006-333493 A
[PTL 6] JP 2003-329419 A

SUMMARY OF INVENTION

Technical Problem

In view of the conventional problems, the purpose of the present invention is to provide a high-speed and high-precision optical scanning three-dimensional measurement technique using an event-based sensor.

Solution to Problem

One aspect of the present disclosure provides a three-dimensional measurement device comprising: a projection unit configured to project a reference light to an object while scanning the reference light; a light reception unit configured to receive the reference light reflected by the object, monitor a luminance change of the reference light for each pixel, and output a position of the pixel, a time point when the luminance change occurred, and a polarity representing a direction of the luminance change as an event, when the luminance change is equal to or greater than a predetermined threshold; and a three-dimensional information calculation unit configured to select an event group including a designated number of events in which the event changes from positive polarity to negative polarity, calculate a time point of passage when the reference light passes the pixel based on the time point of the event included in the event group and the threshold of the luminance change at which the event occurs, and calculate three-dimensional information of the object by triangulation based on the time point of passage.

Another aspect of the present disclosure provides a three-dimensional measurement program for causing a computer to execute the steps of: projecting a reference light to an object while scanning the reference light; receiving the reference light reflected by the object, monitoring a luminance change of the reference light for each pixel, and outputting a position of the pixel, a time point when the luminance change occurred, and a polarity representing a direction of the luminance change as an event, when the luminance change is equal to or greater than a predetermined threshold; selecting an event group including a designated number of events in which the event changes from positive polarity to negative polarity; calculating a time point of passage when the reference light passes the pixel based on the time point of the event included in the event group and the threshold of the luminance change at which the event occurs; and calculating three-dimensional information of the object by triangulation based on the time point of passage.

Advantageous Effects of Invention

According to one aspect of the present disclosure, even in an event-based sensor in which a generation timing of an event is not constant, the time point of passage when the reference light passes through the pixel can be precisely calculated. By selecting the designated number of events, it is possible to mitigate the influence of an error of the time point of each event. On the other hand, by using the event-based sensor, three-dimensional measurement can be performed at a higher speed than a frame-based sensor. As a result, it is possible to provide high-speed and high-precision optical scanning three-dimensional measurement technique using the event-based sensor.

DESCRIPTION OF EMBODIMENTS

The embodiments of the present disclosure will be described in detail below with reference to the attached drawings. In the drawings, identical or similar constituent elements have been assigned the same or similar reference signs. Further, the embodiments described below do not limit the technical scope of the invention described in the claims or the definitions of the terms.

Figure 1:
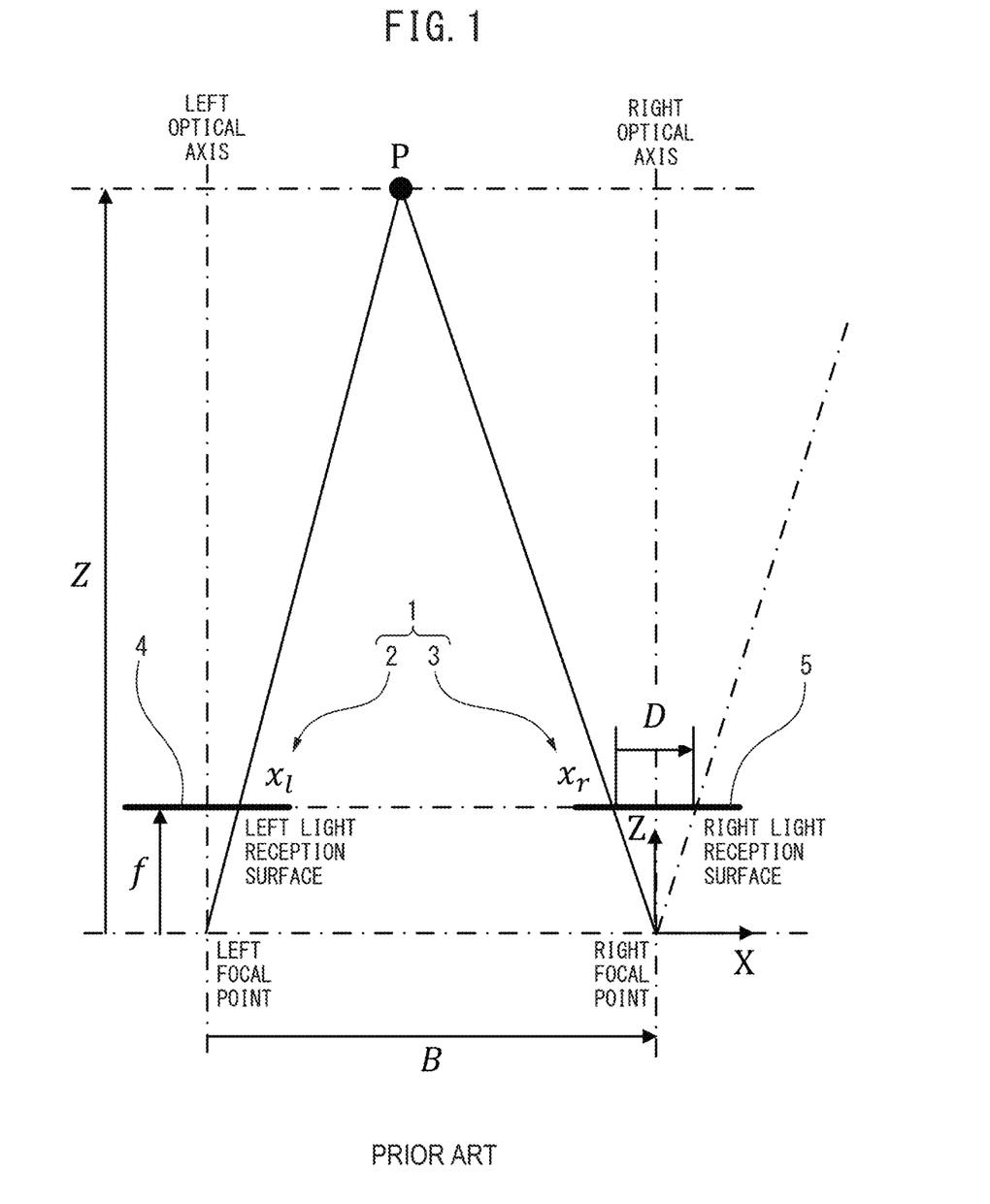
FIG. 1 is a plan view of a stereo camera showing a measurement principle of a stereo method.

A measurement principle of a three-dimensional measurement device of a present embodiment will be described. For easy understanding, measurement principles of a stereo method and a light section method will be described first. FIG. 1 is a plan view of a stereo camera 1 showing the measurement principle of the stereo method. The stereo camera 1 has a left light reception unit 2 and a right light reception unit 3 corresponding to two cameras, for example. For example, the left and right light reception units 2 and 3 are arranged so as to be equi-parallel to each other. That is, both of the light reception units are separated by a base line length B, optical axes of the light reception units are arranged in parallel, a left light reception surface 4 and a right light reception surface 5 are arranged in a plane orthogonal to both optical axes, so that the x- and y-directions of each light reception surface are oriented in the same direction. Each light reception surface is, for example, an image sensor in which a plurality of pixels are arranged two-dimensionally, but may be a line sensor, etc., in which a plurality of pixels are arranged one-dimensionally (for example, arranged only in the x-direction).

In this regard, assuming that a position of a pixel on the left light reception surface 4, on which an image of a point P on an object existing in an object space is projected, is determined as $x_l$, and a position of a pixel on the right light reception surface 5, on which the image of the point P of the object is projected, is determined as $x_r$, a disparity D between the left and right light reception units 2 and 3 is $(x_l-x_r)$ ($D=x_l-x_r$). Assuming that the origin of the XYZ coordinate system representing the three-dimensional space is placed at a right focal point, a focal length of each light reception unit is f, and a pitch between pixels in each of the light reception surfaces is 1, a distance Z to the point P on the object (a depth to the point P (hereinafter, same as above)) is obtained from the following equation.

[Math 1]
$$Z = \frac{Bf}{D} \qquad 1$$

The base line length B and the focal length f are constants determined by the design of the stereo camera 1. Therefore, if the image of the point P on the right light reception surface 5 corresponding to the image of the point P on the left light reception surface 4 can be detected by image processing such as pattern matching, the disparity D can be obtained, and then the distance Z to the point P of the object can be obtained.

Figure 2:
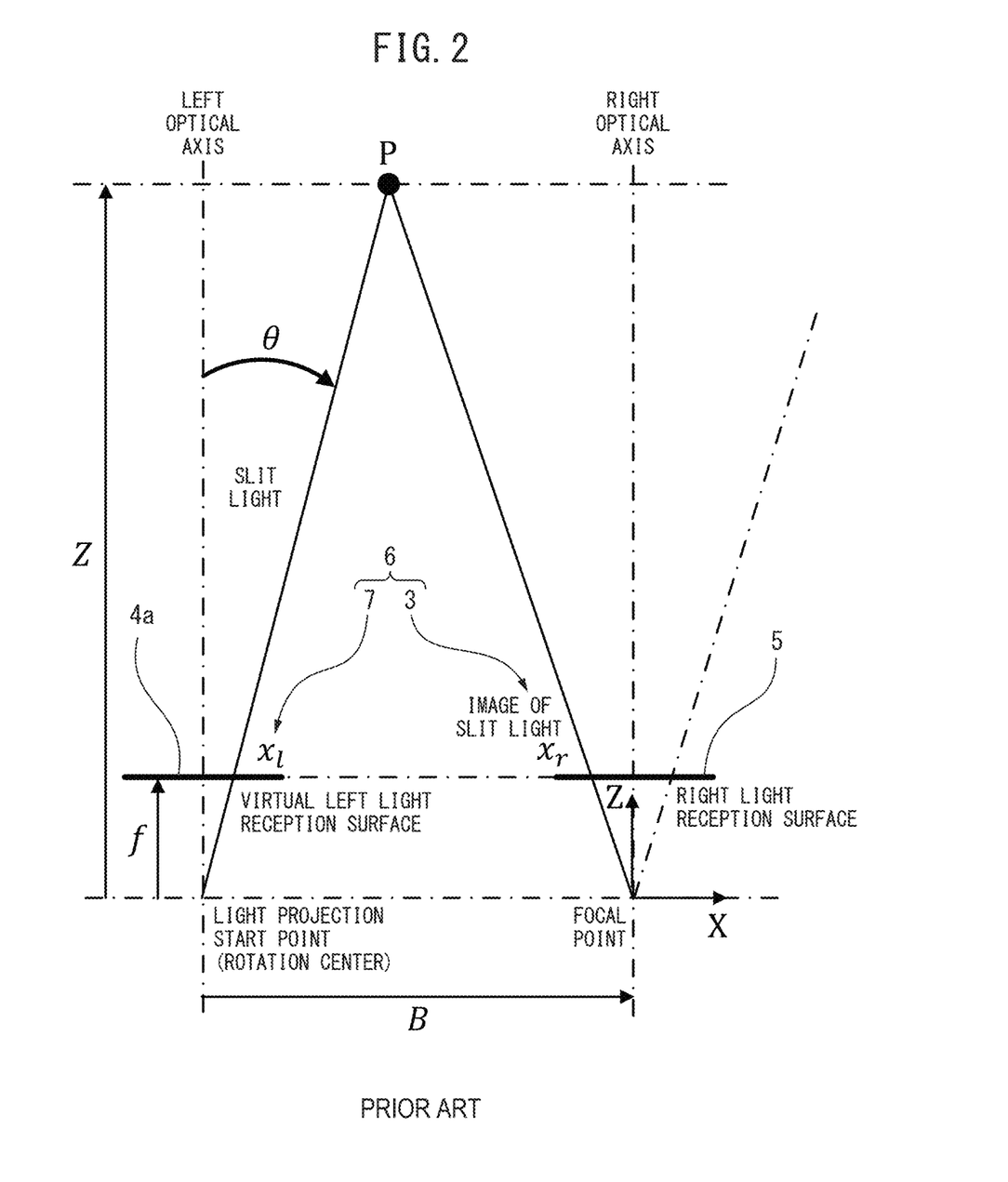
FIG. 2 is a plan view of a light-section system showing a measurement principle of a light-section method.

The light section system is obtained by replacing the left light reception unit 2 of the stereo camera 1 with a light projection unit, for example. FIG. 2 is a plan view of the light section system 6 showing the measurement principle of the light section method. The light section system 6 includes a light projection unit 7 corresponding to, for example, a projector. The light projection unit 7 projects a band-shaped slit light onto the object while scanning it, and the right light reception unit 3 receives the slit light reflected by the object. Herein, assuming that the light projection start point (or a rotation center) is positioned at the left focal point of the stereo camera 1, and a projection angle from the left optical axis of the stereo camera 1 is θ, The pixel position $x_l$ of the virtual left light reception surface 4a of the light projection unit 7 is obtained by the following equation.

$$x_l = f \tan \theta \qquad \text{[Math 2]}$$

Also, assuming that the light projection unit 7 irradiates the band-shaped slit light from the light projection start point while rotating about the Y-axis perpendicular to the XZ plane at a constant angular speed ω, and the slit light passes through the left optical axis at a time point $t_0$, and the slit light is projected on the point P of the object at the projection angle θ at time point t, the projection angle θ can be obtained by the following equation.

$$\theta = \omega(t - t_0) \qquad \text{[Math 3]}$$

Therefore, assuming that the reflected light at the point P of the slit light is received at the position $x_r$ of the pixel on the right light reception surface 5, the distance Z to the point P of the object can be obtained by substituting equations 2 and 3 into equation 1 as shown in the following equation.

[Math 4]
$$Z = \frac{Bf}{D} = \frac{Bf}{f \tan(\omega(t - t_0)) - x_r} \qquad 4$$

The base line length B, the focal length f, the angular speed ω, and the time point to are constants determined by the design of the light section system 6. Therefore, the distance Z to the point P of the object can be obtained by determining the time point t when the slit light is detected at the position $x_r$ of the pixel on the right light reception surface 5.

The three-dimensional measurement device of the embodiment utilizes such a configuration and measurement principle of the light section method. However, it should be noted that the above configuration and measurement principle are examples, and that the design can be changed as appropriate according to the design of the system configuration and layout, etc. For example, the light projection unit 7 and the right light reception unit 3 may not be arranged equi-parallel to each other. Further, instead of replacing the left light reception unit 2 with the light projection unit 7, the light projection unit 7 may be prepared in addition to the left and right light reception units 2 and 3 so as to employ a system configuration combining the stereo method and the light section method. Further, the light projection unit 7 may be employed which projects beam-shaped spot light or block check-shaped pattern light onto the object, instead of the band-shaped slit light. It should be noted that the calculation method of the three-dimensional information also varies according to such design changes.

Figure 3:
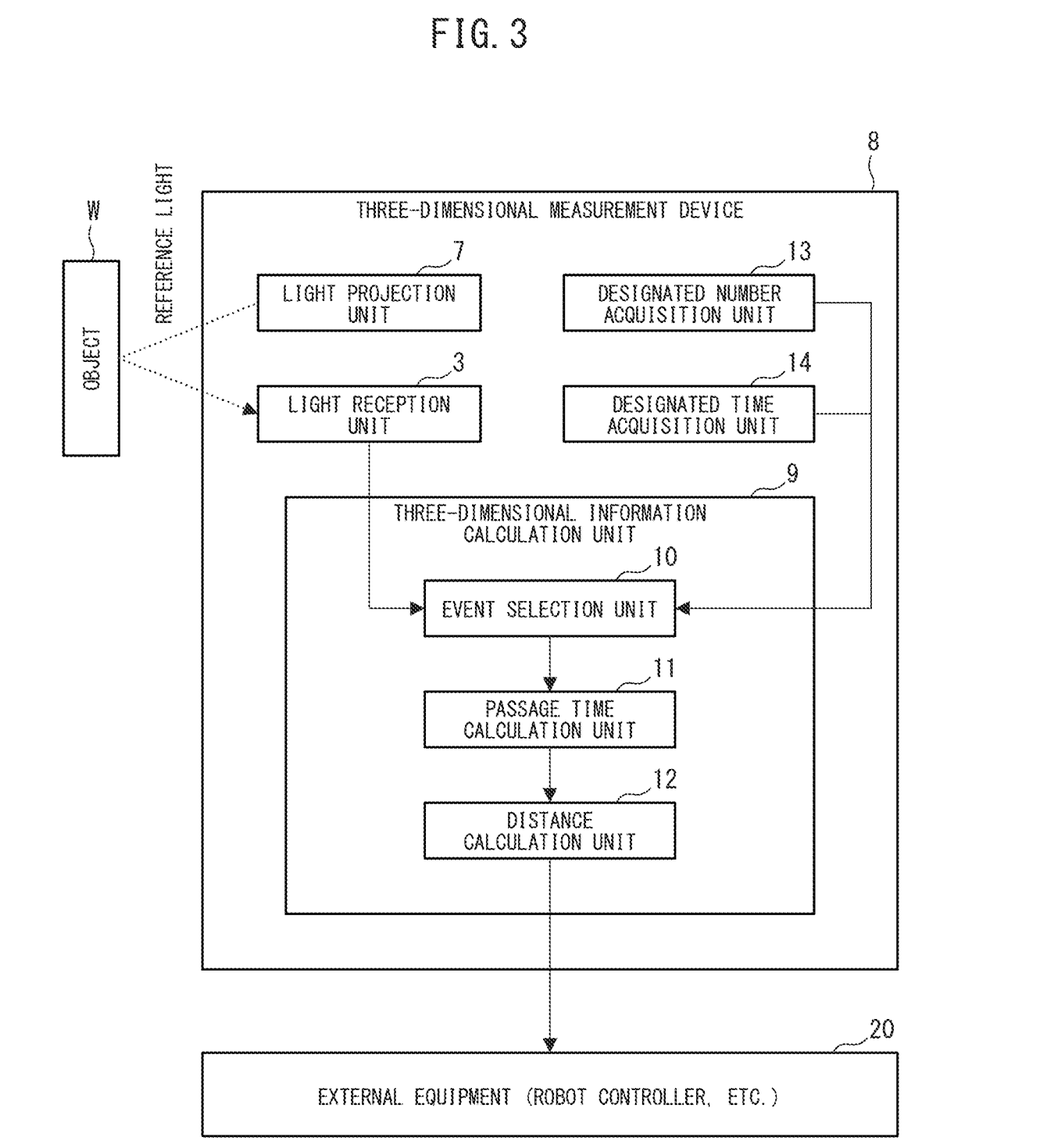
FIG. 3 is a block diagram of a three-dimensional measurement device of an embodiment.

Hereinafter, the configuration of a three-dimensional measurement device of an embodiment will be explained. FIG. 3 is a block diagram of a three-dimensional measurement device 8. Although not shown, the three-dimensional measurement device 8 has a computer device including a processor, a memory, and an input/output unit, etc., for example. For example, the processor has a CPU (Central Processing Unit), the memory has a RAM (Random Access Memory) and a ROM (Read Only Memory), etc., and the input/output unit inputs or outputs various data used or generated by the processor. For example, the memory stores a program executed by the processor and various data used or generated by the processor.

The three-dimensional measurement device 8 has a projection unit 7, a light reception unit 3, and a three-dimensional information calculation unit 9. For example, the projection unit 7 corresponds to a projector, the light reception unit 3 corresponds to a camera, and the three-dimensional information calculation unit 9 corresponds to a processor. It is assumed that time points of the projection unit 7 and the light reception unit 3 are synchronized. The projection unit 7 projects the reference light onto the object W while scanning the reference light, the light reception unit 3 receives the reference light reflected by the object W, and the three-dimensional information calculation unit 9 calculates three-dimensional information of the object W by triangulation, based on the information output from the light reception unit 3. It should be noted that various types of light such as a slit light, a spot light, and a pattern light can be used as the reference light.

The light reception unit 3 has an event-based sensor. The sensor of the light reception unit 3 is, for example, an image sensor in which a plurality of pixels are arranged two-dimensionally, whereas it may be a line sensor in which a plurality of pixels are arranged one-dimensionally. The light reception unit 3 monitors each pixel independently and asynchronously from moment to moment. When a luminance change equal to or greater than a predetermined threshold is detected, the light reception unit 3 outputs the position of the pixel where the luminance change occurred, the time point when the luminance change occurred, and the polarity indicating the direction of the luminance change (whether it has become brighter (positive polarity) or darker (negative polarity)), as an event for each pixel. If the brightness of the background of the object W does not change and there is no noise in the light reception unit 3, there is a high possibility that the reference light passed over a certain pixel when the certain pixel outputs an event. Therefore, the three-dimensional information calculation unit 9 calculates the three-dimensional information of the object W based on the event output from the light reception unit 3.

Figure 4:
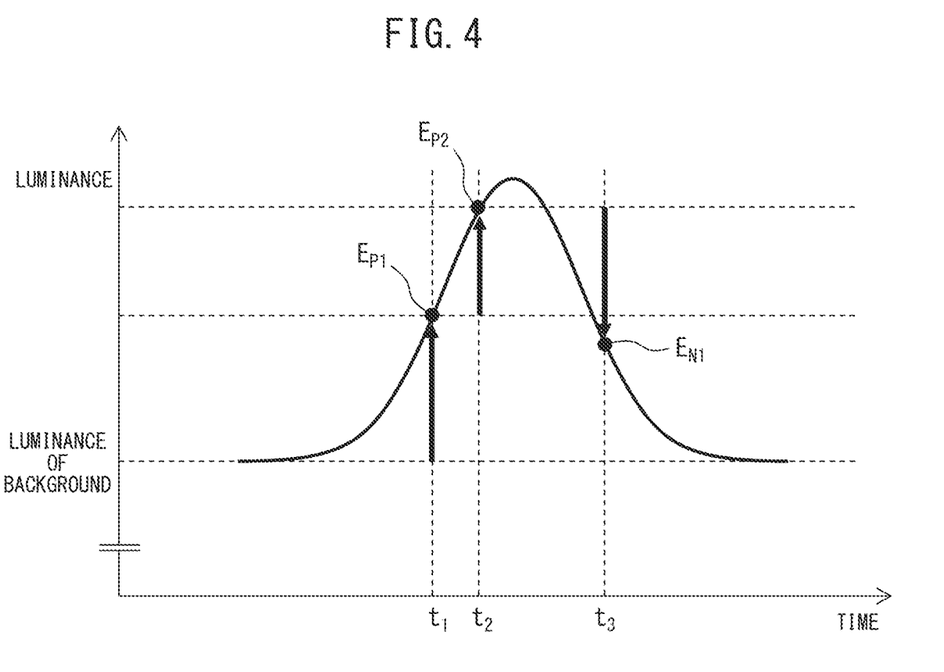
FIG. 4 is a graph of a change in luminance, showing an example of an event group generated by passage of the reference light.

FIG. 4 is a graph of the change in luminance, showing an example of an event group generated by passage of the reference light. The reference light has a certain width and has a luminance distribution with a maximum near the center. Focusing on a certain pixel of the sensor, when the reference light having such a luminance distribution passes through the pixel, the luminance increases as the center of the reference light approaches the pixel, and the luminance decreases after passing through the pixel. When a pixel in an event-based sensor detects such a change in luminance, it is expected that one or more positive events occur as the luminance increases, and one or more negative events occur as the brightness decreases. Although a time point when the reference light passes through the pixel is when the pixel reaches its maximum luminance, the event does not have the luminance itself, and is generally generated when the luminance change from the luminance when the previous event occurred as a reference is greater than or equal to a predetermined threshold. Therefore, the event is not always generated when the luminance is maximum. In the practical use, it is not always necessary that the three-dimensional measurement is performed at the time of maximum luminance, and it is sufficient that the same timing can be obtained with respect to the luminance distribution of the reference light. However, depending on the luminance of the background, it is not known at which stage of the luminance distribution of the reference light the event occurs, and the time interval at which the event occurs is not constant. Therefore, since the event-based sensor cannot accurately detect the time point when the reference light passes through the pixel, sufficient distance measurement accuracy cannot be obtained even if the event-based sensor is applied to the light section method as it is.

Referring to FIG. 3 again, the three-dimensional information calculation unit 9 includes an event selection unit 10, a passage time calculation unit 11, and a distance calculation unit 12. It should be noted that the "-unit" of the three-dimensional information calculation unit 9 is, for example, a functional module realized by the program executed by the processor. The event selection unit 10 selects an event group including a designated number of events in which the event changes from positive polarity to negative polarity, the passage time calculation unit 11 calculates the time point of passage when the reference light passes through the pixel based on the time point of the event included in the event group and the threshold of the luminance change at which the event occurs, and the distance calculation unit 12 calculates the distance to the object W by triangulation based on the time point of passage.

The three-dimensional measurement device 8 may further have a designated number acquisition unit 13, which corresponds to, for example, a user interface (UI), a memory, or a communication unit capable of communicating with external equipment. The designated number acquisition unit 13 acquires the (designated) number of events designated by the user, and sends the designated number to the event selection unit 10.

The event selection unit 10 acquires the designated number from the designated number acquisition unit 13. For example, when the designated number is two, the event selection unit 10 selects an event group including at least two events of positive polarity and negative polarity. However, in order to calculate the time point of passage of the reference light more accurately, the event selection unit 10 preferably selects an event group including at least three events. For example, when the designated number is three, the event selection unit 10 selects an event group including two positive events $E_{P1}$, $E_{P2}$ and one negative event $E_{N1}$, as shown in FIG. 4. Alternatively, an event group including one positive event and two negative events may be selected. When the designated number is three, the amount of calculation can be reduced compared to when more than three events are selected.

In addition, if the intensity of the reference light becomes too weak depending on the reflectance and/or the distance of the object W, the width of the reference light becomes too narrow relative to the pixel size, and/or the scanning speed of the reference light becomes too fast, the sensor may not detect the luminance change and the event does not occur, even though the reference light is actually passing through the pixel. In such a case, the event selection unit 10 cannot select the designated number of events, and the passage of the reference light is missed. Therefore, in order to obtain the designated number of events, in the three-dimensional measuring device 8, the intensity of the reference light, the width of the reference light, the scanning speed of the reference light, the threshold of the luminance change, etc., are previously adjusted according to the sensitivity of the sensor, the pixel size, the event detection rate, etc.

The passage time calculation unit 11 calculates the time point of passage at which the reference light passes through the pixel, based on time points $t_1$, $t_2$ and $t_3$ of the events $E_{P1}$, $E_{P2}$ and ENI included in the event group, and the threshold of the luminance change at which the events $E_{P1}$, $E_{P2}$ and $E_{N1}$ occur, as exemplified in FIG. 4. The threshold of the luminance change at which the event occurs may be, for example, 20% of the luminance when the event occurred last time. In this case, the threshold for positive luminance change may be K1 (K1>1, e.g., K1=1.2) and the threshold for negative luminance change may be K2 (K2<1, e.g., K2=0.8).

Figure 5:
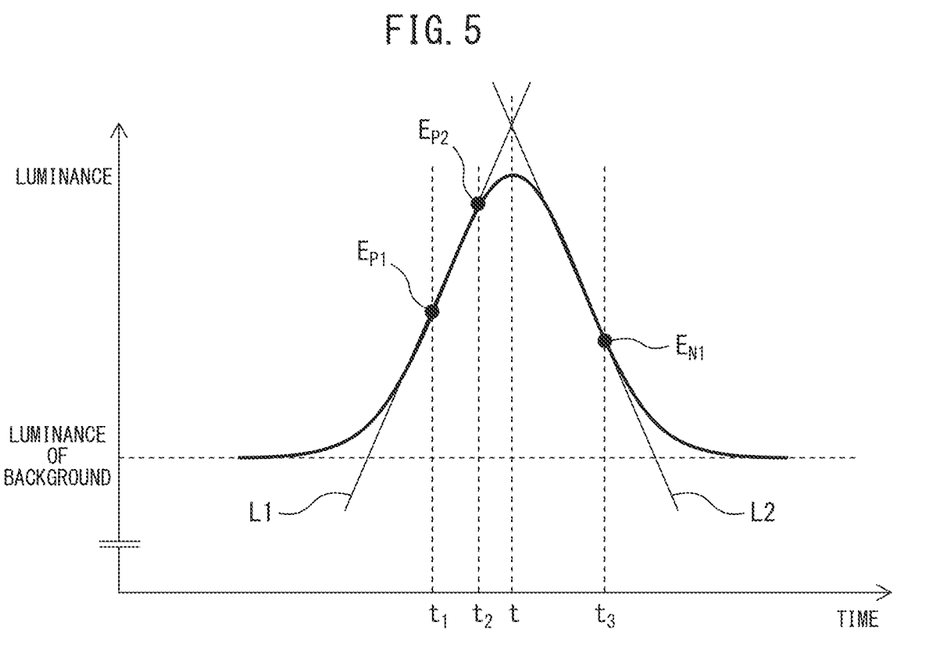
FIG. 5 is a graph of a change in luminance, showing an example of calculation of a time point of passage of the reference light.

FIG. 5 is a graph of the luminance change, showing a calculation example of the time point of passage of the reference light. The passage time calculation unit 11 calculates the time point when the reference light passes through the pixel, i.e., the time point t of the peak of the luminance distribution of the reference light, using interpolation or weighted average, etc. When the interpolation or the weighted averaging is performed, for example, the luminance of the first event in the event group is set to 100, and then the luminance of the previous event may be multiplied by the threshold K1 when a positive event occurs, and the luminance of the previous event may be multiplied by the threshold K2 when a negative event occurs. For example, in the example shown in FIG. 5, the luminance of the first event Epi is 100, the luminance of the second event $E_{P2}$ is 100×1.2=120, and the luminance of the third event $E_{N1}$ is 120×0.8=96. The interpolation or the weighted averaging may be performed using this luminance information.

As the interpolation, for example, polynomial interpolation (Lagrange interpolation, etc.), spline interpolation, linear interpolation, etc., can be used. In the example shown in FIG. 5, since the number of selected events is three, it is preferable to perform calculation by linear interpolation such as equiangular linear fitting, which is said to have a relatively small amount of calculation and high accuracy. In the example shown in FIG. 5, a straight line L1 passes through two positive events $E_{P1}$ and $E_{P2}$, and a straight line L2 has a slope which is the opposite of the slope of the straight line L1 and passes through one negative event $E_{N1}$. A time point at which the straight line L1 and the straight line L2 intersect corresponds to the time point t of the peak of the brightness distribution of the reference light, i.e., the time point of passage of the reference light. Also, although not shown, polynomial interpolation such as parabola fitting may be used.

On the other hand, when the weighted average is used, the time point t of the peak of the luminance distribution of the reference light, i.e., the time point of passage of the reference light may be calculated using the luminance of the event as a weight. In the example shown in FIG. 5, for example, the three selected events $E_{P1}$, $E_{P2}$ and $E_{N1}$ may be weighted with weights of 100, 120 and 96, respectively. A formula for calculating the time point of passage t of the reference light based on the weighted average is as follows, for example.

[Math 5]

$$t = \frac{t_1 \times 100 + t_2 \times 120 + t_3 \times 96}{100 + 120 + 96} \qquad 5$$

By calculating the time point of passage t of the reference light using interpolation or weighted averaging, etc. as described above, the time point of passage t of the reference light can be calculated more accurately even with an event-based sensor in which event generation timing is not constant. In addition, by selecting the designated number N of events, the influence of an error in the time point of each event can be reduced to $1/\sqrt{N}$.

Referring to FIG. 3 again, the distance calculation unit 12 substitutes the time point of passage t of the reference light into, for example, Equation 4, and calculates the distance Z to the point P on the object W imaged on the pixel. The distance Z is the depth from a baseline connecting the light projection starting point of the projecting unit 7 and the focus of the light reception unit 3 as shown in FIG. 2, whereas the distance Z may be converted into the three-dimensional coordinate in the XYZ coordinate system.

The three-dimensional information calculated by the three-dimensional information calculation unit 9 is output to the outside of the three-dimensional measurement device 8. The three-dimensional information is used by external equipment 20 such as a robot controller or a vehicle controller. The external equipment 20 can perform, for example, position control, speed control, acceleration control, etc., based on three-dimensional information calculated at high speed and with high accuracy using the event-based sensor.

According to the above embodiment, the time point of passage t of the reference light can be calculated more accurately. On the other hand, by using the event-based sensor, three-dimensional measurement can be performed at a higher speed than a frame-based sensor. As a result, it is possible to provide high-speed and high-precision optical scanning three-dimensional measurement technique using the event-based sensor. However, the selected events may not be caused by the passage of the reference light in the first place, but may be caused by other factors such as a change in external light, movement of the object, multiple-reflected of the reference light, or a noise in the light reception unit.

Therefore, it is preferable that the three-dimensional measurement device 8 further include a designated time acquisition unit 14, which corresponds to, for example, a UI, a memory, or a communication unit capable of communicating with external equipment. The designated time acquisition unit 14 acquires the passage time (designated time) of the reference light designated by the user, and transmits the designated time to the event selection unit 10.

Figure 6:
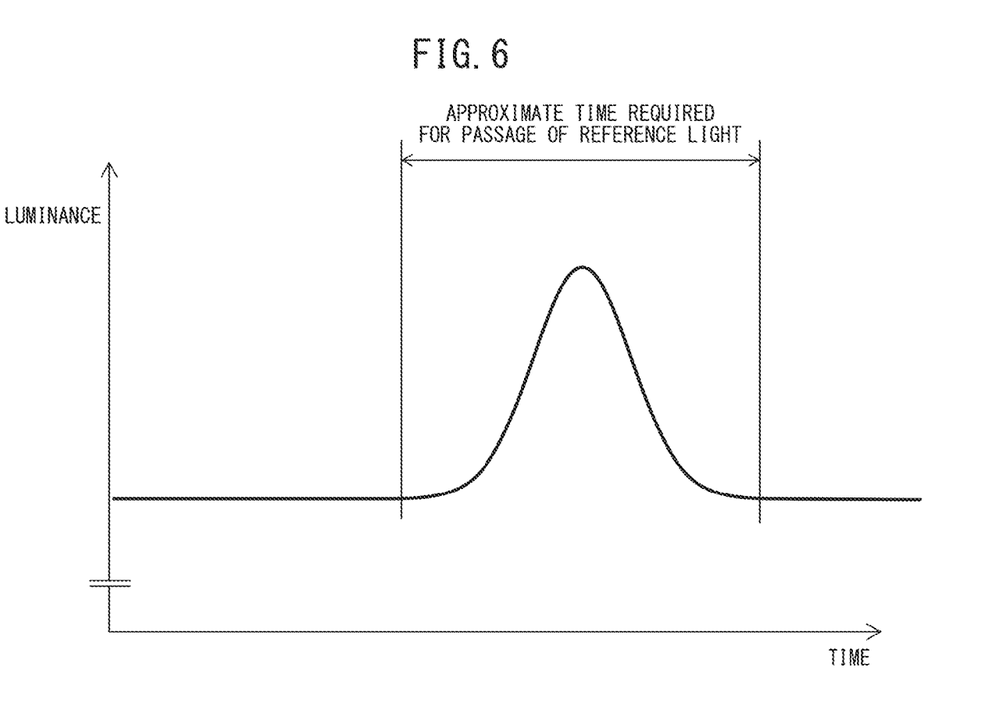
FIG. 6 is a graph of a change in luminance, showing an example of a period of time required for the passage of the reference light.

FIG. 6 is a graph of the luminance change, showing an example of the time required for the passage of the reference light. The time it takes for the reference light to pass over a certain pixel depends on the scanning speed of the reference light, the width of the reference light, the viewing angle of the light reception unit, and the distance to the object imaged on the pixel, etc., which are determined according to the specifications of the three-dimensional measurement device 8. Therefore, for example, it is preferable that the object be scanned with the reference light, the time period of passage of the reference light is measured for each pixel, and based on the time period of passage of the reference light which took the longest time, the designated time, which is considered to take no more time, is calculated. In other words, it is preferable that the designated time be designated as a period of time which is longer than the maximum time required for the reference light to pass through the pixel.

Figure 7:
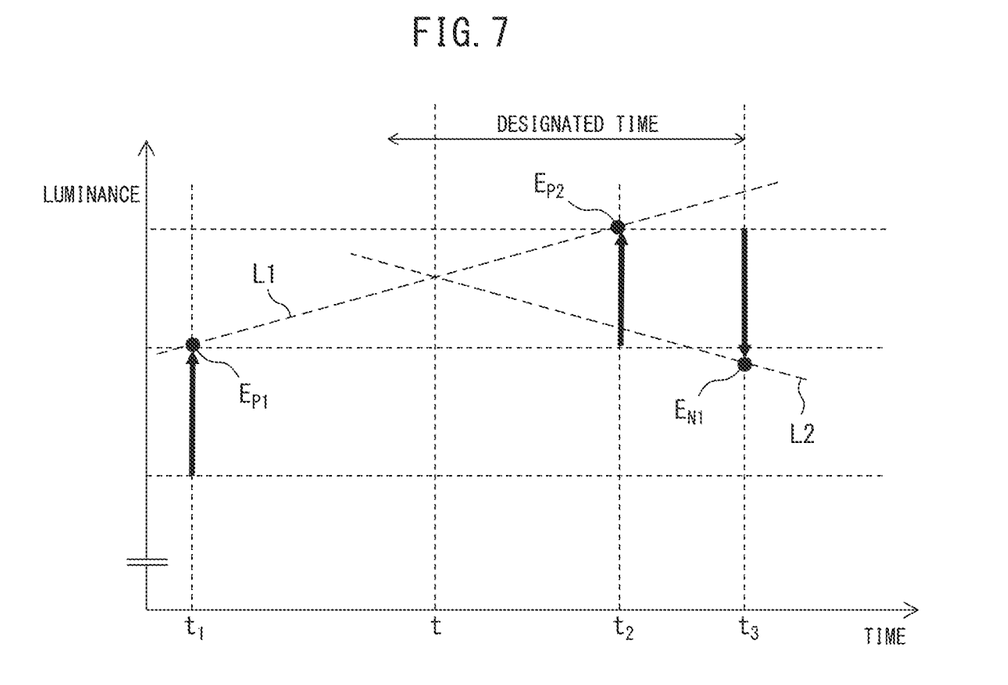
FIG. 7 is a graph of a change in luminance, showing an example of an event that does not exist within a designated period of time.

Referring to FIG. 3 again, the event selection unit 10 acquires the designated time from the designated time acquisition unit 14, and selects an event group including the designated number of events in which the event changes from positive polarity to negative polarity within the acquired designated time. FIG. 7 is a graph of the luminance change, showing an example of an event which does not exist within the designated time period. In the example shown in FIG. 7, the event group including three events $E_{P1}$, $E_{P2}$ and $E_{N1}$ in which the event changes from positive polarity to negative polarity is depicted.

However, the event $E_{P1}$ does not exist within the designated time period and is temporally separated from the other events $E_{P2}$ and $E_{N1}$. In such a case, it is highly likely that the event $E_{P1}$ is not caused by the passage of the reference light, but is a noise event caused by other factors such as changes in external light, movement of the object, multiple-reflected reference light, and a noise in the light reception unit. It is desirable not to select such an event Epi which is extremely separated in time. Therefore, according to the designated time, the event selection unit 10 no longer selects noise events, and thus functions as a filter for removing noise events.

In general, the amount of increase in a luminance change due to a change in external light, movement of the object, multiple-reflected reference light, a noise in the light reception unit 3, etc. is less than an amount of increase in a luminance change caused by the reference light directly reflected by the object. Therefore, when there are a plurality of event groups to be selected, the event selection unit 10 may calculate a rank corresponding to the amount of increase in luminance, and select an event group with the highest rank. Since the rank represents the height of the peak of the luminance distribution of the reference light, it is preferable to calculate the rank at the timing when the positive polarity is changed to the negative polarity. If the thresholds for the positive and negative luminance changes are the same, the threshold may be simply incremented by the number of positive events and decremented by the number of negative events. For example, if events occur in the order positive→positive→positive→negative→negative→negative, and then events occur in the order positive-→negative due to a noise, the rank of the first peak is 3, and the rank of the second peak is 3−3+1=1, so the event selection unit 10 selects the first event group with the rank of 3. Alternatively, instead of decrementing (deducting points) by the number of negative events, the rank may be reset to the initial value 0 when a negative event occurs.

Further, when the threshold for positive luminance change is set to K1 (K1>1), the threshold for negative luminance change is set to K2 (K2<1), and the threshold for positive luminance change and the threshold for negative luminance change are different (K1≠K2), the event selection unit 10 may multiply K1 (add points) by the number of positive events and multiply K2 (subtract points) by the number of negative events. For example, when K1 is 1.2 and K2 is 0.6, and the events occur in the order of positive→positive-→positive→negative→negative→negative, and then the events occur in the order of positive→negative due to a noise, the rank of the first peak is 1.2×1.2×1.2=1.728 and the rank of the second peak is 1.2×1.2×1.2×0.6×0.6×0.6× 1.2≈0.447. Therefore, the event selection unit 10 selects the first event group with the rank of 1.728. Alternatively, instead of multiplying K2 (K2<1) (deducting) by the number of negative events, the rank may be reset to the initial value 1 when a negative event occurs.

Figure 8:
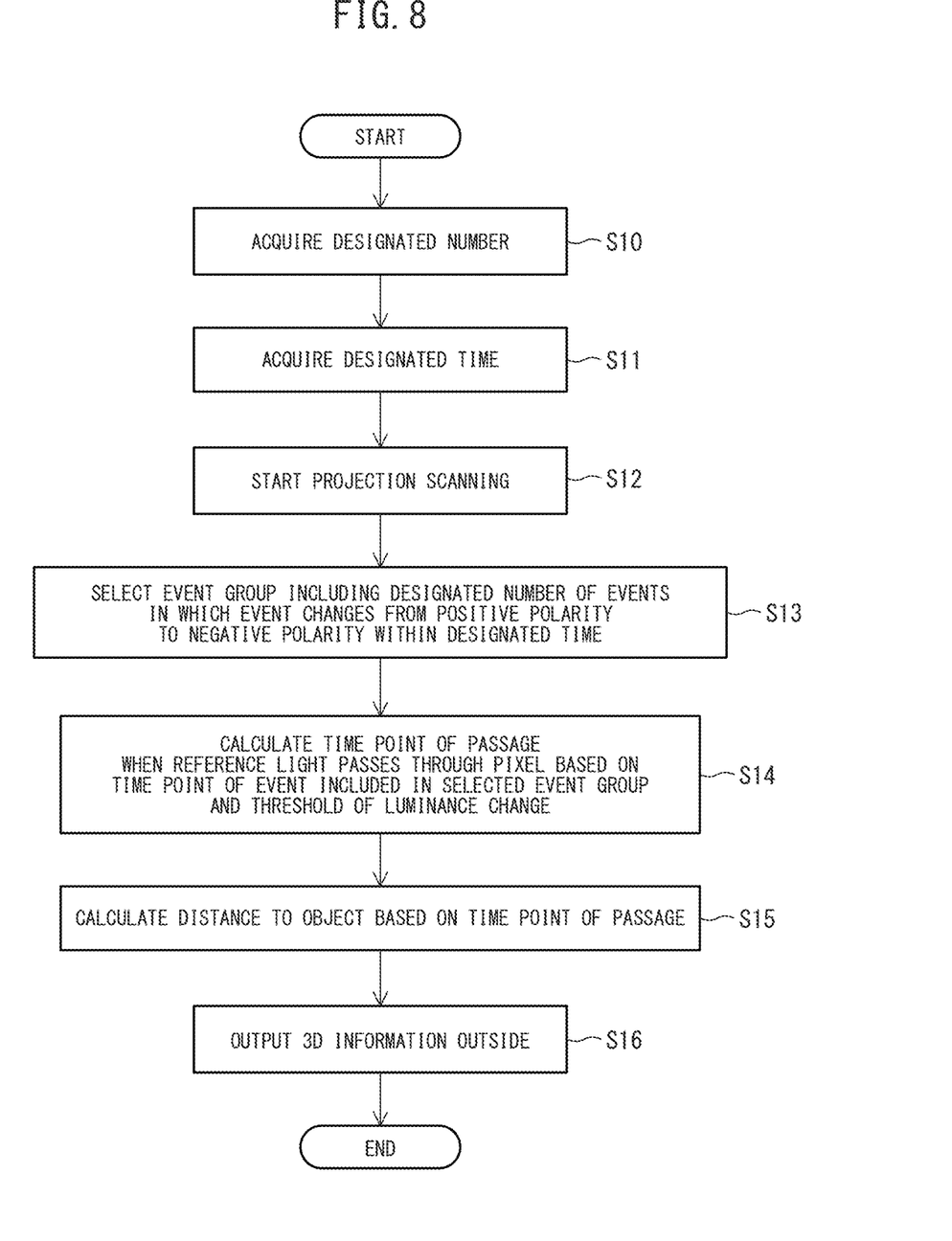
FIG. 8 is a flowchart showing an example of an operation of the three-dimensional measurement device.

FIG. 8 is a flowchart showing an example of the operation of the three-dimensional measurement device 8. Note that this flowchart is executed by, for example, the processor of the three-dimensional measurement device 8. In step S10, the number of events designated by the user (designated number) is acquired. In step S11, the time period of passage (designated time) of the reference light designated by the user is acquired. In step S12, projection scanning is started.

In step S13, an event group including the designated number of events in which the event changes from positive polarity to negative polarity is selected. In this regard, a noise event is not selected by selecting an event group existing within the designated time. If there are a plurality of event groups to be selected, a noise event is not selected by calculating the rank corresponding to the amount of increase in luminance and selecting the event group with the highest rank.

In step S14, the time point of passage when the reference light passes through the pixel is calculated based on the time point of the event included in the selected event group and the threshold of the luminance change. In this regard, it is preferable to calculate the peak time t of the luminance distribution of the reference light using interpolation or weighted averaging, etc.

In step S15, the time point of passage of the reference light is substituted into Equation 4, for example, and the distance to the object is calculated by triangulation. In this regard, the distance may be converted into three-dimensional coordinates instead of the depth. In step S16, the calculated three-dimensional information of the object is output to the outside.

Since steps S10 to S11 are preprocessing for three-dimensional measurement, they may be performed when the three-dimensional measurement device 8 is installed, calibrated, etc., and steps S12 to S16 may be performed while the three-dimensional measurement device 8 is performing measurement. Therefore, these steps may be implemented as separate programs, and may not be a continuous processing. Also, it should be noted that it is not necessary to perform step S16 when the three-dimensional measurement device 8 and the external equipment 20 shown in FIG. 2 are mounted on the same device.

It should be noted that the above configuration and operation of the three-dimensional measurement device 8 are examples, and that other configurations can be adopted. For example, the three-dimensional measurement device 8 may not have a processor for executing a program, but may have an integrated circuit which does not execute a program (e.g., an FPGA (Field-Programmable Gate Array) or an ASIC (Application Specific Integrated Circuit), etc.). In this case, the "-unit" of the three-dimensional information calculation unit 9 shown in FIG. 2 is implemented as a section constituting the integrated circuit.

According to the above embodiments, even with an event-based sensor in which occurrence timings of events are not constant, it is possible to more accurately calculate the time point of passage when the reference light passes through the pixels. In addition, by selecting the designated number N of events, the influence of an error in the time point of each event can be reduced to $1/\sqrt{N}$. On the other hand, by using the event-based sensor, three-dimensional measurement can be performed at a higher speed than a frame-based sensor. As a result, it is possible to provide high-speed and high-precision optical scanning three-dimensional measurement technique using the event-based sensor.

Also, by using the event-based sensor, the distance is calculated for each pixel of the light reception unit 3, and thus a dense distance image can be generated. In addition, since the event processing is independent for each pixel, parallelization is possible, and a secondary effect is obtained that is not affected by individual differences of pixels in the light reception unit.

It should be noted that the programs executed by the processor described above may be recorded and provided on a computer-readable non-transitory recording medium such as a CD-ROM, or may be distributed and provided wired or wirelessly from a server device on a WAN (Wide Area Network) or LAN (Local Area Network).

Although the various embodiments are described herein, it should be noted that the present invention is not limited to the above embodiments, and various modifications can be made within the scope of the claims.

REFERENCE SIGNS LIST 1 stereo camera
2 left light reception unit
3 right light reception unit (light reception unit)
4 left light reception surface
5 right light reception surface (light reception surface)
6 light section system
7 light projection unit
8 three-dimensional measurement device
9 three-dimensional information calculation unit
10 event selection unit
11 passage time calculation unit
12 distance calculation unit
13 designated number acquisition unit
14 designated time acquisition unit
20 external equipment
B base line length
D disparity
$E_{P1}$, $E_{P2}$ event of positive polarity
$E_{N1}$ event of negative polarity
f focal length
K1, K2 threshold
L1, L2 straight line
P point on object
$t_1$, $t_2$, $t_3$ time point of event
W object
Z distance to point P of object
θ projection angle

The invention claimed is:

1. A three-dimensional measurement device, comprising:
projector configured to project a reference light to an object while scanning the reference light;
a sensor configured to
receive the reference light reflected by the object,
monitor a luminance change of the reference light received by the sensor for each pixel, and
in response to the luminance change being equal to or greater than a predetermined threshold, output a position of the pixel, a time point when the luminance change occurred, and a polarity representing a direction of the luminance change, as an event; and
a processor configured to, for each pixel,
select an event group including a designated number of events in which the event changes from positive polarity to negative polarity,
calculate a time point of passage when the reference light passes the pixel using a time point of each of the events included in the event group and the predetermined threshold of the luminance change at which each of the events occurs, and
calculate three-dimensional information of the object by triangulation using the calculated time point of passage,
wherein the processor is configured to, in response to a plurality of the event groups to be selected, calculate a rank corresponding to an amount of increase in luminance, and select the event group in which the rank is highest, and
wherein the processor is configured to calculate the rank by adding a point corresponding to the number of the positive event which occurred in each pixel, and by resetting to zero when a negative event occurred.

2. The three-dimensional measurement device according to claim 1, wherein the processor is configured to, for each pixel, select the event group including at least three of the events.

3. The three-dimensional measurement device according to claim 1, wherein the processor is configured to, for each pixel, select the event group including the designated number of events in which the event changes from positive polarity to negative polarity, within a designated period of time.

4. A computer-readable non-transitory recording medium configured to record a three-dimensional measurement program for causing a computer to execute:
projecting a reference light to an object while scanning the reference light;
receiving the reference light reflected by the object;
monitoring a luminance change of the received reference light for each pixel;
in response to the luminance change being equal to or greater than a predetermined threshold, outputting a position of the pixel, a time point when the luminance change occurred, and a polarity representing a direction of the luminance change, as an event; and
for each pixel, selecting an event group including a designated number of events in which the event changes from positive polarity to negative polarity;
for each pixel, calculating a time point of passage when the reference light passes the pixel using a time point of each of the events included in the event group and the predetermined threshold of the luminance change at which each of the events occurs;
for each pixel, calculating three-dimensional information of the object by triangulation using the calculated time point of passage; and
calculating, in response to a plurality of the event groups to be selected, a rank corresponding to an amount of increase in luminance, and selecting the event group in which the rank is highest,
wherein the rank is calculated by adding a point corresponding to the number of the positive event which occurred in each pixel, and by resetting to zero when a negative event occurred.

* * * * *